(12) United States Patent
Shreeve et al.

(10) Patent No.: US 6,623,049 B2
(45) Date of Patent: Sep. 23, 2003

(54) BATTERY LATCH (75) Inventors: Alissa Shreeve, Lawrenceville, GA (US); Ray Lathrop, Atlanta, GA (US); William C. Phelps, III, Lawrenceville, GA (US)

(73) Assignee: Motorola, Inc., Schaumburg, IL (US)

( * ) Notice: Subject to any disclaimer, the term of this patent is extended or adjusted under 35 U.S.C. 154(b) by 18 days.

(21) Appl. No.: 10/027,310

(22) Filed: Dec. 21, 2001

(65) Prior Publication Data

US 2003/0116976 A1 Jun. 26, 2003

(51) Int. Cl.[7] .................................................. E05C 7/00
(52) U.S. Cl. .................................. 292/19; 292/DIG. 61; 429/97
(58) Field of Search ............................. 292/19, 20, 80, 292/87, 91, DIG. 11, DIG. 61; 429/96, 97, 98, 99, 100, 123; 455/90, 347, 348, 349; 361/600, 814

(56) References Cited

U.S. PATENT DOCUMENTS

| | | | | | |
|---|---|---|---|---|---|
| 375,094 A | * | 12/1887 | Petersen | | |
| 682,117 A | * | 9/1901 | Sayre | | |
| 1,933,898 A | * | 11/1933 | Falk | ............................ | 292/218 |
| 2,855,773 A | * | 10/1958 | Evans | ........................... | 70/181 |
| 2,985,704 A | * | 5/1961 | Kempf | ........................... | 136/173 |
| 4,068,871 A | * | 1/1978 | Mercer | ........................... | 292/48 |
| 4,436,792 A | * | 3/1984 | Tomino et al. | .................. | 429/1 |
| 4,848,810 A | * | 7/1989 | Gosse et al. | .................. | 292/129 |
| 5,607,792 A | * | 3/1997 | Garcia et al. | .................. | 429/97 |
| 5,622,395 A | * | 4/1997 | Shine et al. | .................. | 292/125 |
| 5,794,994 A | * | 8/1998 | Miyagawa et al. | ........ | 292/336.3 |
| 5,895,729 A | * | 4/1999 | Phelps, III et al. | ............ | 429/97 |
| 5,967,572 A | * | 10/1999 | Sajfert et al. | ............. | 292/336.3 |
| 5,997,115 A | * | 12/1999 | Radloff et al. | ............... | 312/222 |
| 6,076,869 A | * | 6/2000 | Chen et al. | ................... | 292/202 |
| 6,129,395 A | * | 10/2000 | Schlesener et al. | .......... | 292/128 |

* cited by examiner

Primary Examiner—Gary Estremsky
(74) Attorney, Agent, or Firm—Philip H. Burrus, IV (57) ABSTRACT

This invention includes a latch member for a latch assembly, suitable for a removable battery package. The latch member accommodates attachment to a latch coupler of an electronic device. A resilient, springy-metal, deflectable latch member is provided. The latch member includes arms for coupling with a latch coupler, a locking arm for adhering to a plastic housing, and spring arms that cause a torsion element to twist when force is applied to the arms. The torsion element is at least twice as long as it is wide, and provides reliable return force despite a short travel length of the arms. The latch member is suitable for battery packages in which space is a premium.

7 Claims, 7 Drawing Sheets

FIG.1

PRIOR ART

FIG.2

PRIOR ART

BATTERY LATCH

BACKGROUND

1. Technical Field

This invention relates generally to latch devices, and more particularly, latch devices for removable battery packages for portable electronic products.

2. Background Art

Portable electronic devices, such as two-way radios, telephones, electronic games and personal data assistants for example, often have removable battery packages for supplying power. In many such configurations, a removable battery package is secured to a host electronic device by a latch system. The latch system ordinarily includes a portion situated on the battery package, and a portion situated on the host device. These portions then mate together to secure the battery package to the host device.

In one prior art approach, the latch system includes a catch on the battery package that engages a movable latch member on the host device. A user removes the battery package from the host device by pushing on the movable latch member to disengage the latch member from the catch. One problem with this approach is the cost of repair when the movable latch member on the host device is defective or is otherwise damaged. The host device must often be disassembled to replace the movable latch member, which can result in substantial expense.

Additionally, although the primary function of latch assemblies is to retain the battery to the electronic device, battery latches are typically required to perform multiple tasks as well. For example, the latch is used to ensure a snug, rattle-free fit between the battery and the electronic equipment. Furthermore, the latch often carries the burden of providing drop protection for the entire battery assembly. The difficulty associated with latch design optimization is compounded by often-competing design requirements. For example, while the latch should be designed to provide a snug fit between the battery assembly and the equipment housing (i.e., preventing disengagement when the product is dropped), the user must be able to engage and disengage the battery housing with minimal effort.

Manufacturers of portable electronic equipment are constantly trying to improve latch designs to meet these aforementioned requirements, often under cost and manufacturing constraints. For example, commonly assigned U.S. Pat. Nos. 5,607,792, issued to Garcia et al., and U.S. Pat. No. 5,895,729, issued to Phelps, III et al., each describe removable battery packages that incorporate reliable and efficient button latch assemblies for portable electronic devices. These patents are incorporated herein by reference for all purposes. Still, not withstanding these patents, design constraints—like space restrictions—within the battery pack sometimes preclude the use of these reliable latches. It would be therefore be desirable to have a similar type of latch mechanism that is as reliable and can be used in design environments where space is a premium.

DETAILED DESCRIPTION OF THE INVENTION

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on."

Figure 1:
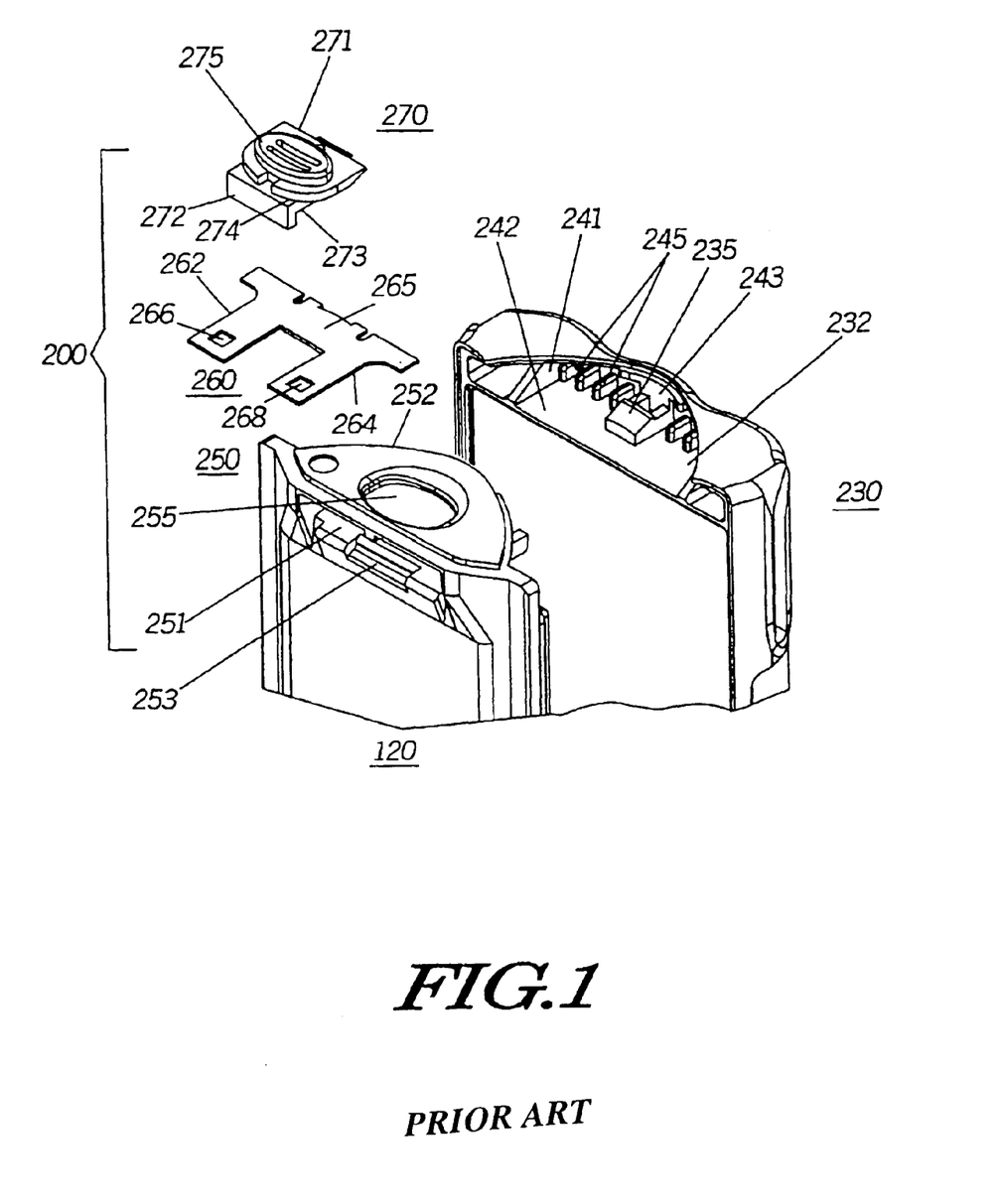
FIG. 1 is an illustration of a commonly assigned, prior art latch assembly.
Figure 2:
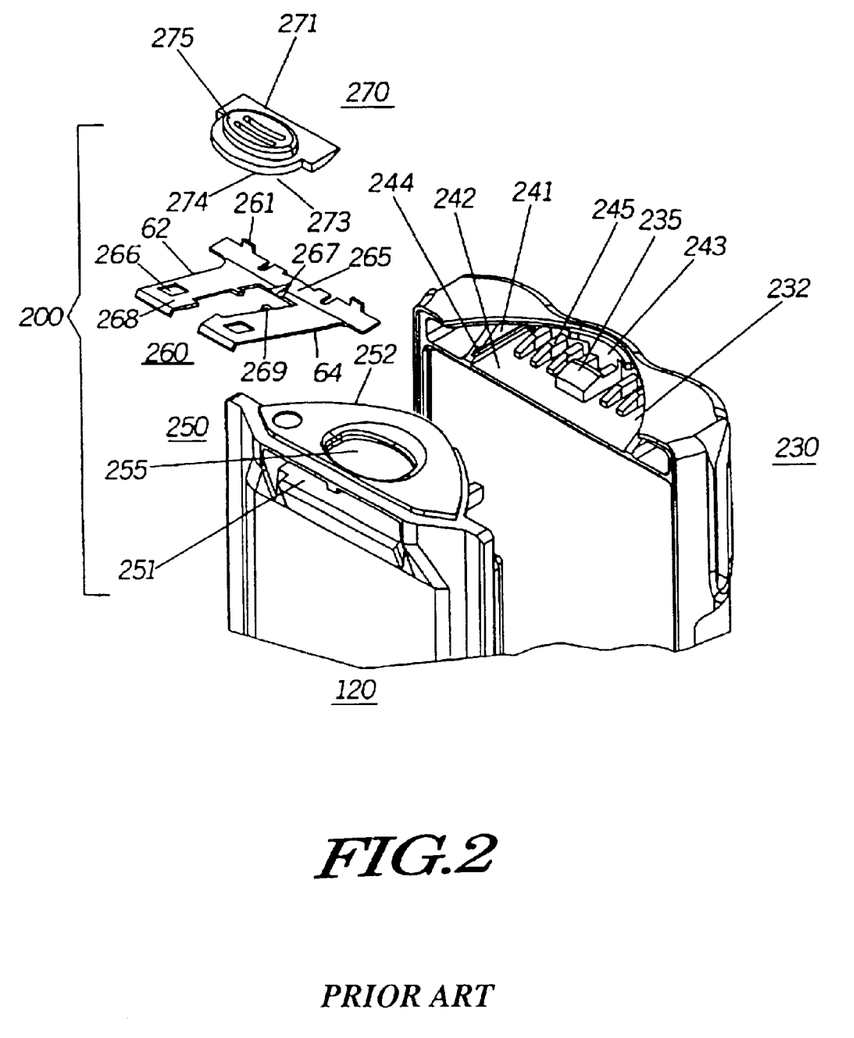
FIG. 2 is an illustration of a commonly assigned, prior art latch assembly.

Referring now to FIG. 1, illustrated therein is a commonly assigned, prior art latch assembly. FIG. 2 is a fragmentary, exploded, perspective view of the battery package 120. The battery latch assembly 200 constitutes the portion of the battery latch system on the battery package. The battery latch assembly 200 is formed from a portion of a battery housing member 230, a portion of a second battery housing member or battery cover 250, a latch member 260, and a button 270.

The battery housing member 230 is preferably formed from plastic in a single piece mold construction. The battery housing member 230 has a latch mount portion 232 in the form of a recess or cavity in the battery housing member 230. The latch mount portion 232 is defined by a plurality of sidewalls 241, 242, and 243, that form the surfaces of the latch mount portion 232. Projections 245 extend from at least one surface 243 to define a narrow or restricted access latch member mount channel. The latch mount portion 232 further includes a raised portion or projection 235 extending within the cavity that forms a retention member or stop for the latch member 260. Thus, the projections 245 form mount guides for mounting the latch member 260, and the raised portion 235 serves to secure the latch member 260.

The latch member 260 is a resilient cantilever structure preferably formed from stamped sheet metal. In one preferred embodiment, the latch member 260 includes two resilient cantilever arms 262, 264 connected by a bridge member 265. Each cantilever arm 262, 264 has a latch portion, or catch 266, 268. Preferably, the catch is a slot extending through an end portion of the cantilever arm.

The button 270 is preferably formed from molded plastic. The button 270 has finger grip portion 275 formed on a platform 271. A mount base 273 extends from beneath the platform to form a groove 274 between the platform 271 and the mount base 273. A protrusion 272 extends from the mount base 273 to form a stop or locking feature for the latch assembly.

The battery cover 250 is preferably formed from molded plastic. The battery cover 250 attaches to the battery housing member 230 to form an enclosure. The battery cover 250 has an overhanging wall portion 252 extending over the latch mount portion 232 of the battery housing member 230. The battery cover 250 has a button hole 255 for accommodating the button 270. The button hole 255 is preferably sufficiently large to allow the finger grip portion 275 of the button 270 to have a lateral range of movement within the button hole. The battery cover 250 also has a passage 251 extending therethrough that provides access to the latch member 260. A notch 253, formed along a surface defining the passage 251, accommodates the protrusion 272 of the button to support the locking and unlocking feature of the latch assembly.

Referring now to FIG. 2, illustrated therein is another commonly owned, prior art latch assembly solution. The battery housing portions are identical to those recited in accordance with FIG. 1. The difference between FIG. 1 and FIG. 2 lies in the cantilever arms 62, 64 of FIG. 2. Here, the cantilever arms are bent away from the plane of the bridge member 265 to create a pre-loaded spring force against the button 271.

From both FIGS. 1 and 2, it will be noted that the spring force exerted against the buttons is delivered by the cantilever motion of the arms. For example, again referencing FIG. 2, the bridge member 265 is held in a fixedly rigid position by the latch mount portion 232 of the battery housing 230. This fixed relationship allows the latch mount portion 232 to hold the bridge member 265 steady while the button 271 exerts force on the cantilever arms 62, 64. In effect, the latch mount portion 232 acts as a fulcrum for the cantilever arms 62, 64 to work against. This type of scheme works well when the housing 230 allows enough room for molding a plurality of sidewalls 241, 242, and 243, projections 245, and a raised portion 235, all of which are part in parcel of the latch mount portion 232.

As electronic devices have gotten smaller and smaller, however, designers have less and less room in which to include features like a latch mount portion. This invention thus resolves this issue by offering an improvement over the prior art in that no latch mount portion is required.

Figure 3:
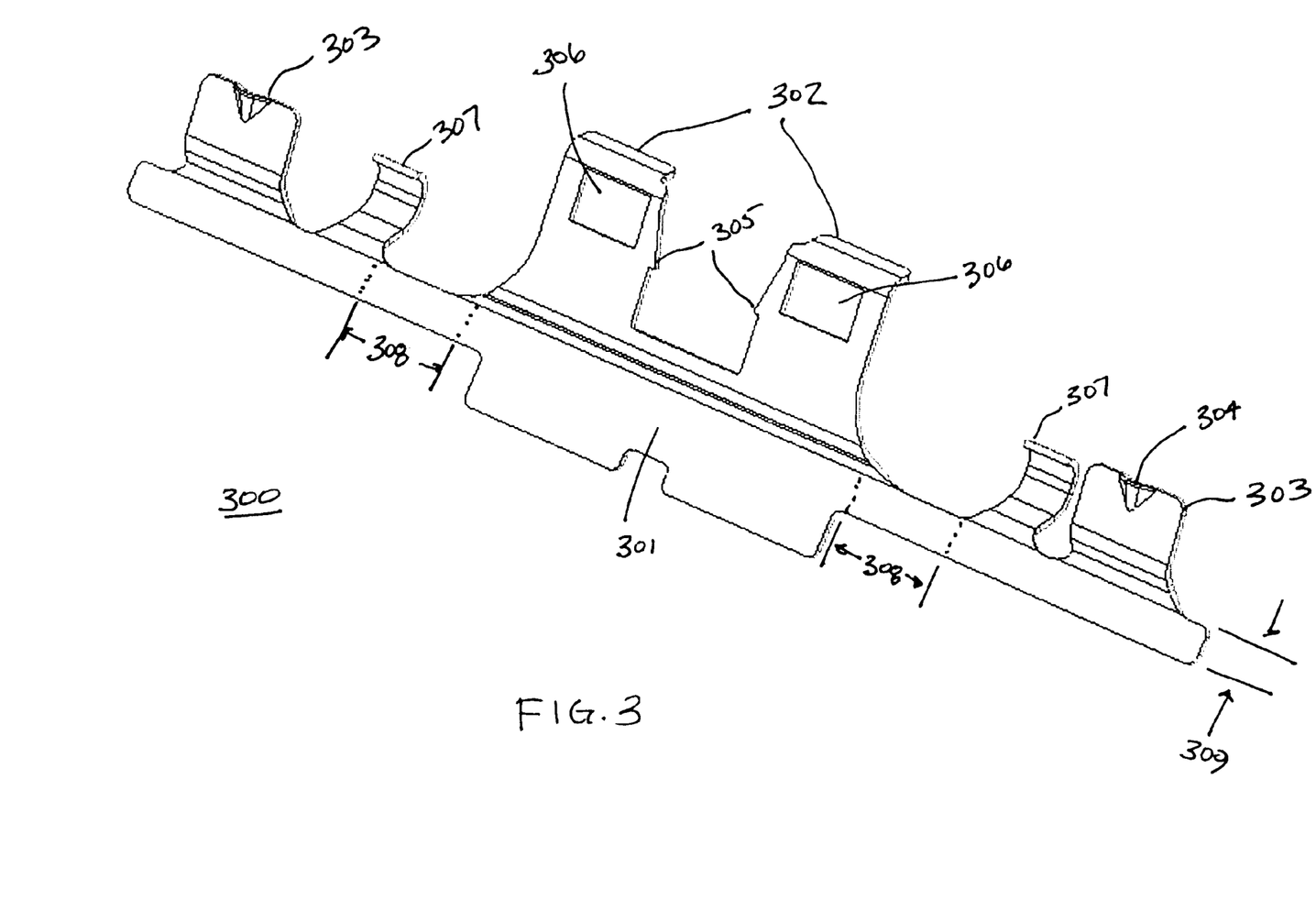
FIG. 3 is an illustration of a springy-metal latch member in accordance with the invention.

Referring now to FIG. 3, illustrated therein is an improved springy-metal latch member 300 in accordance with the invention. The latch member 300 is a resilient structure preferably formed from stamped, springy, sheet metal. Like the prior art, the latch member 300 includes a bridge member and two arms 302 for receiving a button.

The bridge member 301 includes a pair of integral locking tabs 303 disposed angularly above the plane of the bridge member 301. Each locking tab 303 includes a v-shaped notch 304 that is used to hold the latch member 300 in a battery housing. The v-shaped notch 304 performs the dual function of keying the latch (i.e., instructing an assembler as to which way to insert the latch member into a battery housing). It will be clear to those of ordinary skill in the art that it is not necessary for the notch to be v-shaped, as other notch shapes will work equally well.

The arms 302 are angled upwards to provide a preloaded force, and latch portions or catches 306 extend through an end portion of each respective arm 302. A button may be inserted between the arms 302. Once received, the button is locked in place between first and second pairs of tabs 305 extending inwardly from the arms 306.

The improvement of the latch member 300 lies in the actuation of the arms 302. Whereas the prior art relied upon a latch mount portion to act as a fulcrum for cantilever arms, the present invention employs curved spring arms 307 that provide a return force for the button. When the spring arms 307 rest against a battery housing, they form rigid members relative to the bridge member. The bridge member 301 has been designed to include a torsion element 308 that twists when force is applied to the arms 302. Rather than actuating a purely cantilever motion, the latch member 300 uses torsion to provide return force. This allows the latch member 300 to operate in design environments where space does not allow a full-blown latch mount portion.

To provide the proper torsion, the bridge member 300 must be properly designed to provide torsion elements 308 that are capable of twisting without breaking or deforming. The length of the torsion element 308—length being defined as the distance between the spring arm 307 and the arm 302—must be at least a certain proportion to the width 309 of torsion member 308. Experiments and finite element analysis have shown that this ratio must be at least 2:1. In other words, the length of the torsion element 308 must be at least twice the width. In one preferred embodiment, experiments yielded reliable performance at a ratio of 4:1. This ratio provided reliable spring force across thousands of cycles with no cracking, breaking or deformation.

Figure 4:
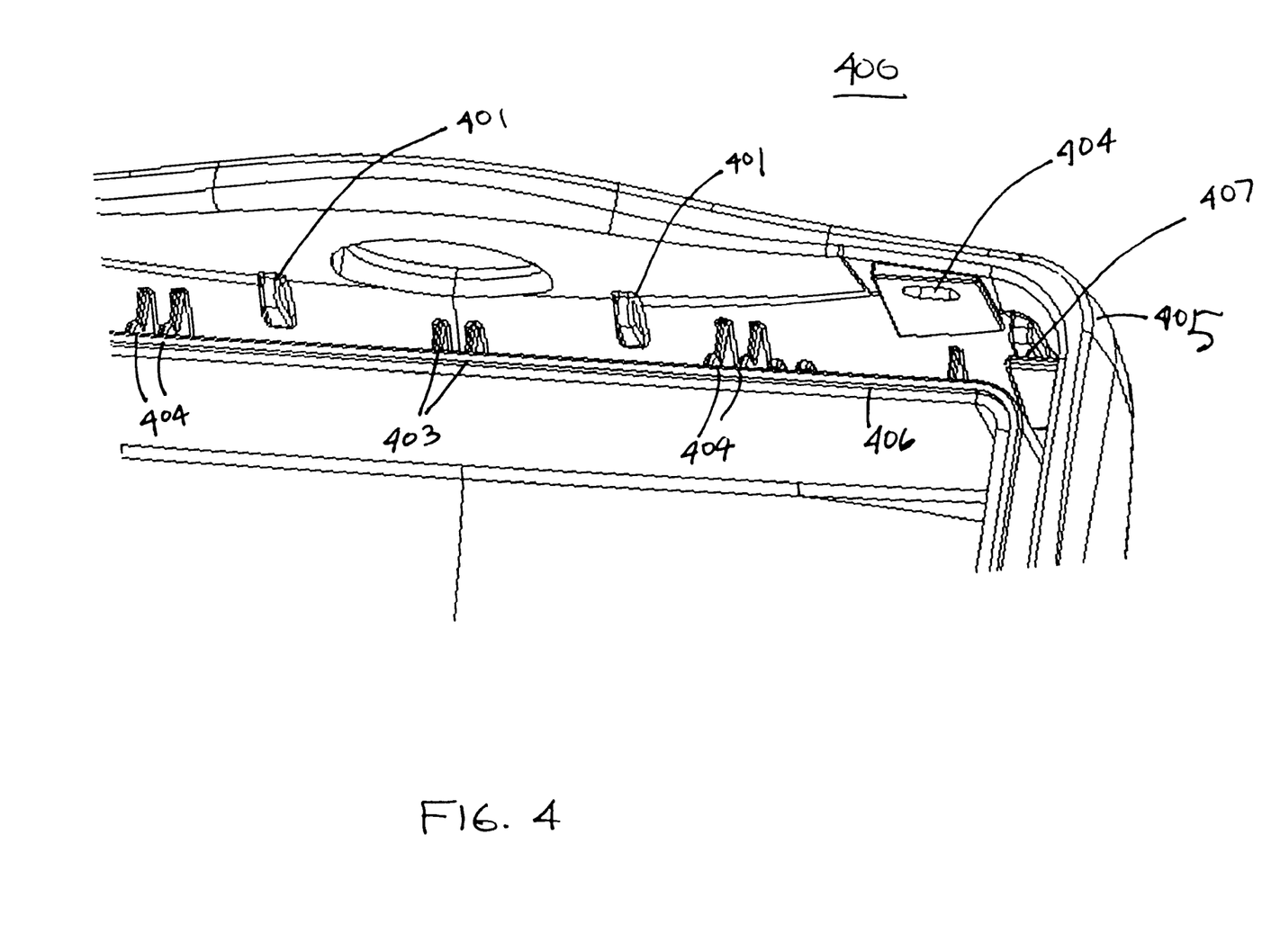
FIG. 4 is an illustration of an exemplary battery housing for accommodating a springy-metal latch apparatus in member with the invention.

Referring now to FIG. 4, illustrated therein is an exemplary housing 400 in which the latch member may operate. As can be seen from the figure, the depth of the upper housing 405 is too shallow to accommodate a latch mount portion. In its stead resides a series of small notches 401, 403, and 404 that simply guide the latch member into the housing. These notches, 401, 403, and 404 assist the technician in aligning the latch member at assembly.

Apertures 404 are present in the upper housing 401 for receiving the v-shaped notches of the locking tabs of the latch members. Additionally, a thin, flat stabilization plane 406 is provided to accommodate the spring arm of the latch. Optional end slots 407 may also be included to provide additional support to the torsion elements.

The invention offers numerous advantages over the prior art. The spring fingers, which help facilitate the twisting of the torsion elements, also work to eliminate "play" within the housing. They provide a solid button-latch feel, with no looseness or wobble. Further, the torsion-action of the latch member allows the latch member to operate in design environments where space is at a premium. The torsion element provides a high force even though the travel distance of the arms may be relatively short.

Figure 5:
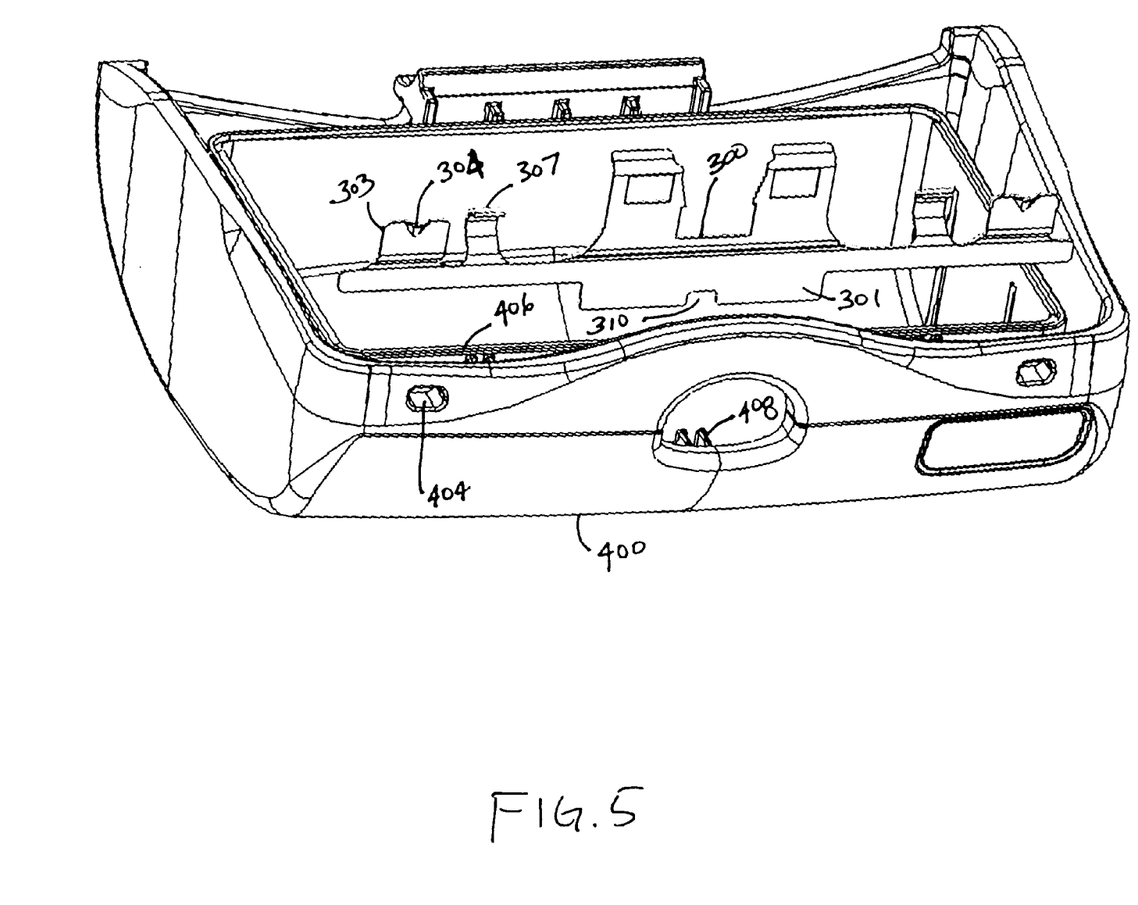
FIG. 5 is an exploded view of a latch member in accordance with the invention just prior to insertion into a battery housing.

Referring now to FIG. 4, illustrate therein is an exploded view of the latch member 300 just prior to insertion in to a battery housing 400. A notch 310 on the bridge member 301 mates with a guide post 408 in the battery housing 400 to ensure proper alignment. The spring arm 307 will rest upon the stabilization plane 406 after insertion. The notch 304 on the locking arm 303 interfaces with the aperture 404 once the latch member 300 is seated in the battery housing 400.

Figure 6:
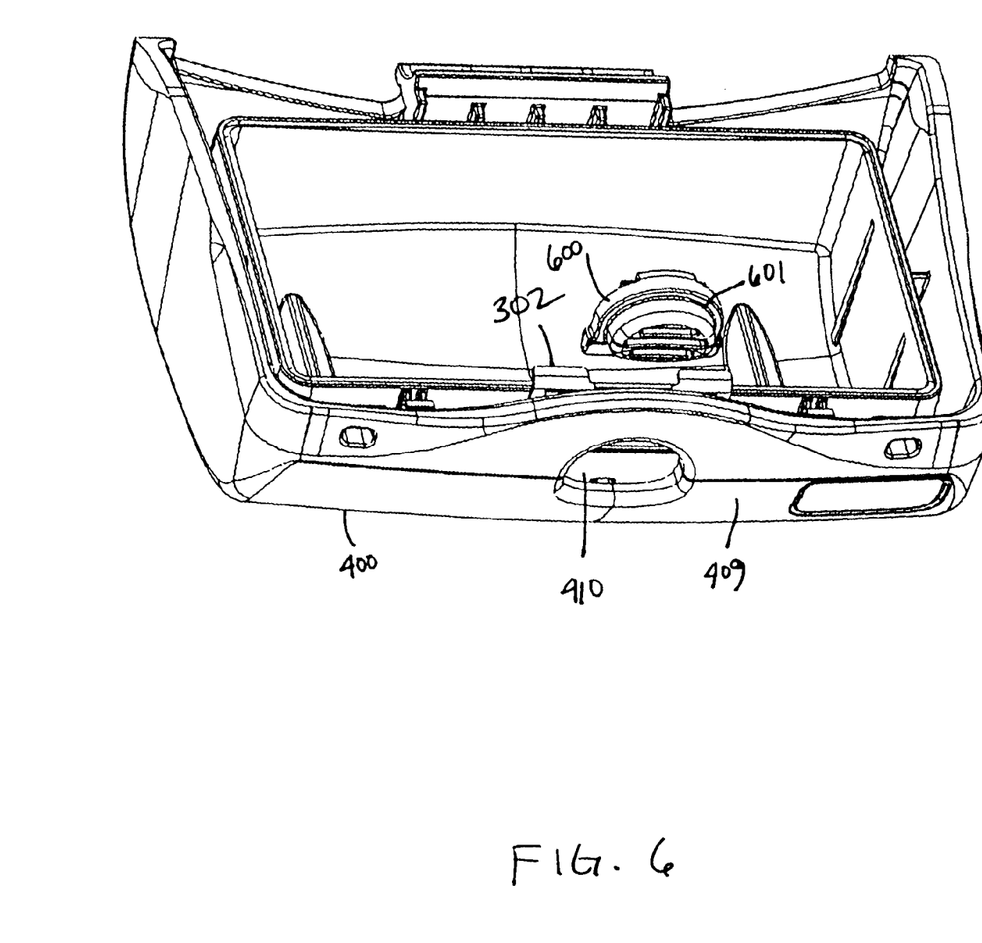
FIG. 6 is an exploded view of a button prior to insertion into a battery housing in accordance with the invention.
Figure 7:
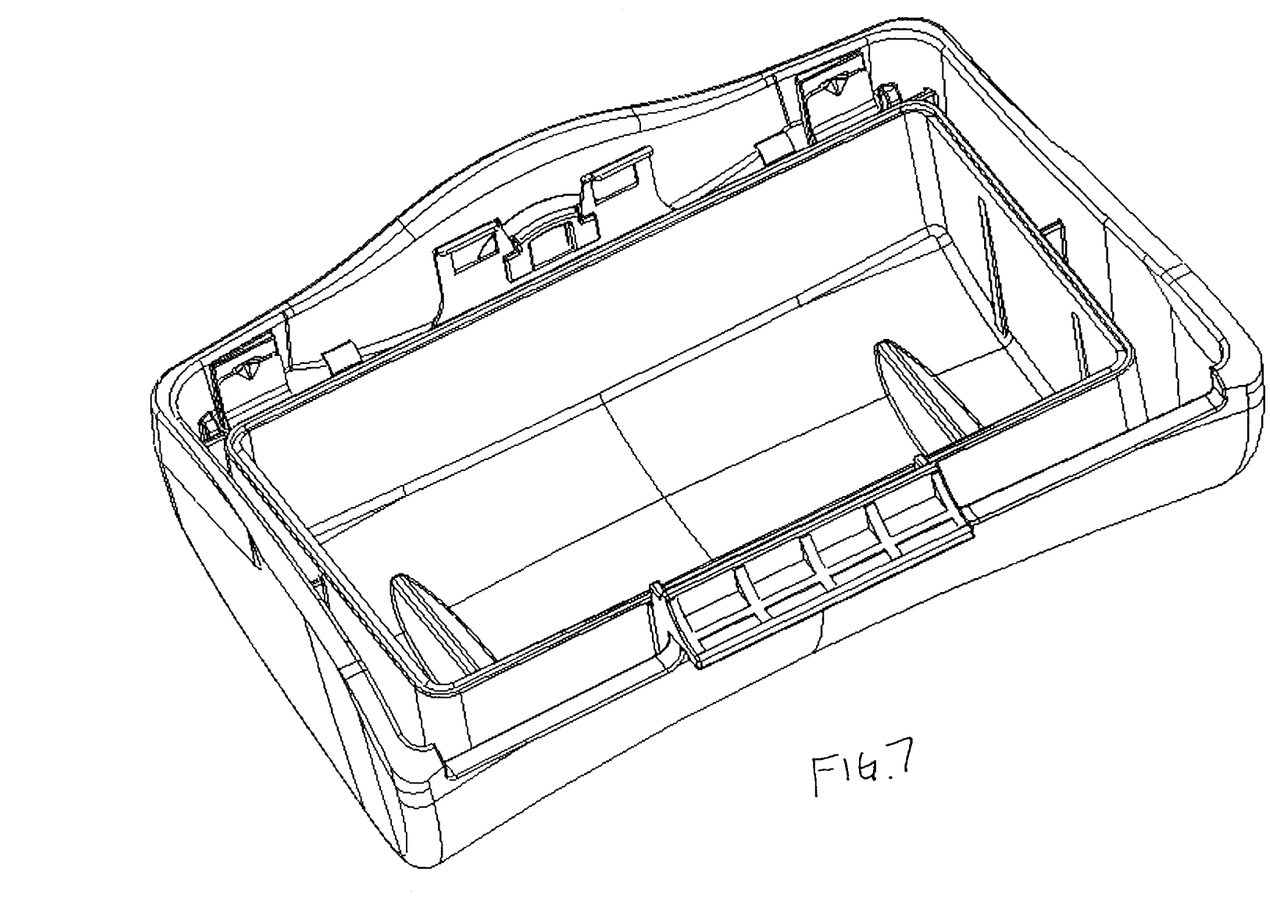
FIG. 7 is an assembled battery housing in accordance with the invention.

Referring now to FIG. 6, a button 600 may then interface with the arms 302 of the latch member. When the button is first inserted, the arms 302 travel away from the outer portion 409 of the housing. The button then slips into the button hole 410. Both the ledge 601 on the button 600, which interfaces with the button hole 401, and the button itself interfacing with the tabs (element 305 of FIG. 3) ensure that the button will not dislodge from the housing. FIG. 7 illustrates the assembled battery housing.

While the preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. For example, while one preferred embodiment recites the latch member being employed in a battery pack, other two-piece device requiring attachment may also employ the latch member.

What is claimed is:

1. A single and integral elate element latch member comprising:
   a. a bridge member;
   b. at least one arm, the arm having at least one aperture therethrough;
   c. at least one locking tab;
   d. at least one spring arm; and
   e. at least one torsion member for providing a torsional force alone its main axis, the main axis defining a length, the at least one torsion member having a width;
   wherein the length of the at least one torsion member is at least twice the width.

2. The member of claim 1, wherein the length of the at least one torsion member is between 4 and 5 times the width.

3. The member of claim 2, wherein the at least one arm is preloaded, wherein the preloading is achieved by providing arms bent upwards and away from the plane of the bridge member.

4. The member of claim 3, wherein the member is manufactured of springy metal.

5. The member of claim 4, wherein the locking tab further comprises a v-shaped notch.

6. In a latch assembly for a removable battery package having a latch coupler, wherein the removable battery package includes a battery housing having a socket that mates with the latch coupler, a single and integral plate element latch member secured within the socket, the latch member being resilient and deflectable, and being biased in a first position, the latch member having a latch portion for engaging the latch coupler, and a button mounted on the latch member, the button being depressible to deflect the latch member to a second position, the improvement comprising:
   at least one torsion member for providing a torsional force along its main a disposed within the latch member, the torsion member having a length defined by the main axis and also a width;
   wherein the length of the at least one torsion member is at least twice the width.

7. The improvement of claim 6, wherein the length of the latch member is between 4 and 5 times the width.

* * * * *